United States Patent

[11] 3,572,474

[72] Inventor Gert A. Persson
 Oxie, Sweden
[21] Appl. No. 794,268
[22] Filed Jan. 27, 1969
[45] Patented Mar. 30, 1971
[73] Assignee Svenska Aktiebolaget Bromsregulator
 Malmo, Sweden

[54] RAILWAY VEHICLE BRAKE RIGGING
 6 Claims, 7 Drawing Figs.
[52] U.S. Cl. ................................................. 188/197,
 188/153, 188/202
[51] Int. Cl. ........................................... F16d 65/44
[50] Field of Search ........................................ 188/153,
 196 (M), 197, 198—203 (S)

[56] References Cited
UNITED STATES PATENTS
2,913,071 11/1959 Mueller .................... 188/153
3,037,398 6/1962 Cross ..................... 188/196(V)X
3,131,788 5/1964 Newell .................... 188/202(S)X
3,430,739 3/1969 Persson et al. ............. 188/202(S)

Primary Examiner—Duane A. Reger
Attorney—Laurence R. Brown

ABSTRACT: A railway vehicle brake rigging is disclosed with a power source such as a pneumatic cylinder actuating a pivoted lever against a shoulder on a pushrod for moving a brake shoe into the wheel. Provisions are made to vary the pivot axis position while maintaining axial contact between the pivoted lever and the pushrod by means of introducing spacing elements between a housing assembly containing the pivoted lever and the mounting for the pushrod. The movement of the pivot axis position permits the application of different forces to the brake shoe.

Patented March 30, 1971
3,572,474
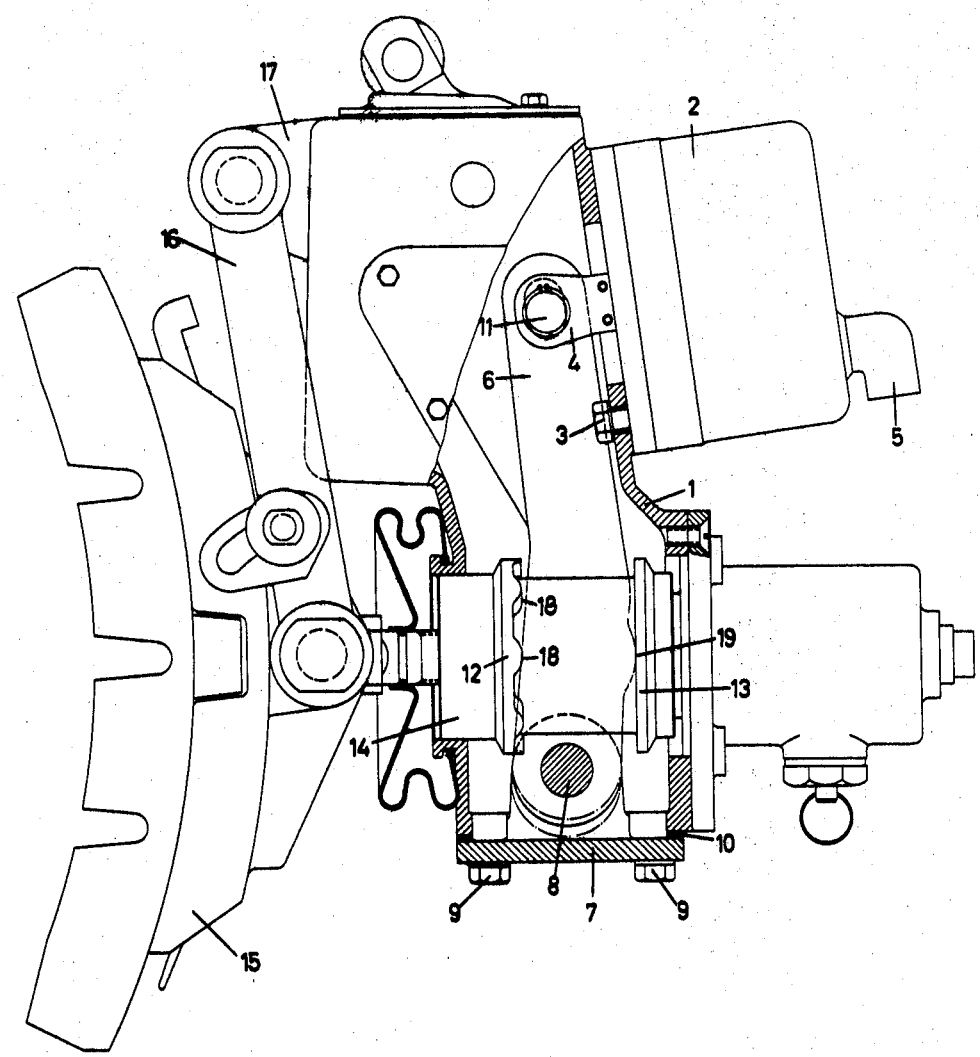
INVENTOR
Gert Artur Persson
BY Laurence R. Brown
ATTORNEY

RAILWAY VEHICLE BRAKE RIGGING

This invention relates to a railway vehicle brake rigging of the type comprising a housing, a cylinder mounted on said housing, a piston movably arranged in the cylinder and adapted to activate a brakeshoe via a transmission including a lever which is pivotally mounted in said housing to act axially on a pushrod through shoulders on said pushrod.

In brake riggings of this type it may sometimes be desirable to transmit different brake forces to the brakeshoes, e.g. in case brakeshoes having a high friction coefficient are substituted by shoes of the lower friction type or vice versa. It is not practical to change the cylinder pressure or size and it is difficult to provide a variable leverage by conventional means.

According to the present invention the brake rigging of the above type is characterized in that the lever is pivotally connected to a bracket fastened to said housing. Hereby it is possible to vary leverage in the transmission simply by using spacer elements of varying size between said housing and said bracket.

The invention will be described in more detail reference being made to the accompanying drawing showing a brake rigging according to the invention partially in vertical section.

The brake rigging shown comprises a housing 1 carrying a brake cylinder 2 which is fastened to the housing 1 by means of a number of bolts 3 only one of which is shown. The cylinder contains a piston having a piston rod 4 and compressed air may be fed into the cylinder 2 through a pipe 5 in order to activate the piston and expel the piston rod 4.

A lever 6 is pivotally secured to a bracket 7 by means of a pin 8. The bracket 7 is secured to the housing 1 by means of bolts 9. The vertical position of the pin 8 relative the housing 1 may be adjusted by clamping distance elements 10 of varying size between the housing 1 and the bracket 7. The lever 6 is connected to the piston rod 8 by means of a pin 11 which is passed through a slot hole in the lever 6 allowing vertical movements of the said lever.

The lever 6 is located between two shoulders 12 and 13 on a push member 14 slidably mounted in the housing 1 and acting on a brakeshoe 15 adapted to be forced against the rim of the vehicle wheel (not shown). The brakeshoe 15 is supported by a hanger 16 which is pivotally suspended from a bracket 17 at the top of the housing 1.

The front shoulder 12 on the push member 14 is provided with a number of axially protruding parts 18 angularly spaced along the shoulder 12. These protruding parts 18 have a curvature engaging the surface of lever 6 to ensure that the contact between the lever 6 and the shoulder 12 always will be established at the level of the axis of the push member 14 regardless of the position of the pin 8.

The lever 6 is at its rear side provided with a protruding part 19 for engaging the rear shoulder 13 on the push member 14. The level of contact between the lever 6 and the rear shoulder 13 will thus vary with the level of the pin 8, but as the forces to be transmitted at the rear side of the lever 6 are the return forces which are comparatively small no problems will arise.

The described brake rigging will operate as follows:

Upon feeding of compressed air to the cylinder 2 through the pipe 5 the piston rod 4 will be expelled and move the lever 6 counterclockwise around the pin 8. The brake force will be transmitted to the push member 14 through the shoulder 12 and force the brakeshoe 15 in the direction towards the wheel rim. It will be understood that the force transmitted will depend upon the level of the pin 8 relative the housing 1 or in other words upon the thickness of the distance elements 10. In case a low coefficient of friction exists between the braking surfaces the distance elements 10 should be thin or omitted. In case of a high friction comparatively thick distance elements should be used.

I claim:

1. Improvements in railway brake riggings of the type having a housing and a power source for operating the brakeshoes, comprising pushrod means coupled to actuate the brakeshoe, a lever pivoted relative to said housing connected to said power source engaging said pushrod, and means changing the vertical pivot position of said lever in said housing to vary the force applied upon said pushrod by operation of said power source.

2. A brake rigging according to claim 1 wherein the power source comprises a movable piston rod having a linear axis of motion, said lever is connected to said piston rod, and the means changing the pivot position moves the pivot position in a direction perpendicular to said axis.

3. A brake rigging as defined in claim 1 wherein the housing has affixed thereto a bracket establishing the pivot position of said lever.

4. A brake rigging as defined in claim 3 including spacing means between said bracket and said housing establishing the position of said pivot axis.

5. A brake rigging as defined in claim 1 including protruding shoulders angularly spaced about said pushrod shaped to engage said lever along the axis of the pushrod as the pivot position of said lever is varied.

6. A brake rigging as defined in claim 5 wherein the shoulders engage said lever when forces are applied during braking.